(12) United States Patent
Lee et al.

(10) Patent No.: US 10,999,026 B2
(45) Date of Patent: May 4, 2021

(54) OTFS BASIS ALLOCATION METHOD IN WIRELESS COMMUNICATION SYSTEM USING OTFS TRANSMISSION SYSTEM

(71) Applicant: LG ELECTRONICS INC., Seoul (KR)

(72) Inventors: Hojae Lee, Seoul (KR); Sangrim Lee, Seoul (KR); Kwangseok Noh, Seoul (KR); Dongkyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 16/320,407

(22) PCT Filed: Jul. 27, 2016

(86) PCT No.: PCT/KR2016/008200
§ 371 (c)(1),
(2) Date: Jan. 24, 2019

(87) PCT Pub. No.: WO2018/021591
PCT Pub. Date: Feb. 1, 2018

(65) Prior Publication Data
US 2019/0268113 A1    Aug. 29, 2019

(51) Int. Cl.
*H04L 5/00* (2006.01)
*H04L 27/26* (2006.01)

(52) U.S. Cl.
CPC .............. *H04L 5/0016* (2013.01); *H04L 5/00* (2013.01); *H04L 27/26* (2013.01);
(Continued)

(58) Field of Classification Search
CPC combination set(s) only.
See application file for complete search history.

(56) References Cited

U.S. PATENT DOCUMENTS 9,130,638 B2 *  9/2015  Hadani ............... H04B 1/1027
2010/0111138 A1   5/2010  Hosur et al.
(Continued)

FOREIGN PATENT DOCUMENTS

EP          1432168 A1     6/2004
WO     2011/137699 A1    11/2011

*Primary Examiner* — Hassan A Phillips
*Assistant Examiner* — Prenell P Jones
(74) *Attorney, Agent, or Firm* — Dentons US LLP

(57) ABSTRACT

A method for receiving orthogonal time, frequency and space (OFTS) basis allocation information by an user equipment in a wireless communication system using an OTFS transmission scheme includes receiving control information including information on an OTFS basis size N from a base station; and receiving data on OTFS bases of a predetermined size indexed according to a pre-defined rule in an N×N OTFS transform matrix on time and frequency domains corresponding to the OTFS basis size, wherein the OTFS bases of the OTFS basis size N is represented into an N×N OTFS transform matrix, wherein in the N×N OTFS transform matrix, a row index represents a cyclic frequency shift index, and a column index represents a cyclic time shift index, wherein the indexing according to the pre-defined rule includes indexing the OTFS bases of the predetermined size in an order such that the cyclic frequency shift and the cyclic time shift in the N×N OTFS transform matrix are maximized.

12 Claims, 16 Drawing Sheets

(52) U.S. Cl.
CPC ...... *H04L 27/2607* (2013.01); *H04L 27/2671* (2013.01); *H04L 27/2672* (2013.01)

(56) References Cited

U.S. PATENT DOCUMENTS

| | | | |
|---|---|---|---|
| 2011/0116516 A1 | 5/2011 | Hwang et al. | |
| 2011/0293030 A1 | 12/2011 | Rakib et al. | |
| 2014/0169433 A1* | 6/2014 | Hadani | H04L 5/0016 375/229 |
| 2015/0326273 A1* | 11/2015 | Rakib | H04L 5/0007 375/131 |
| 2015/0327085 A1* | 11/2015 | Hadani | H04L 25/022 370/252 |
| 2019/0215109 A1* | 7/2019 | Hadani | H04B 7/005 |
| 2020/0288333 A1* | 9/2020 | Rakib | H04L 5/0048 |

* cited by examiner

FIG. 13

Alternative 1)

(N=2)

| 1 | 3 |
|---|---|
| 4 | 2 |

(N=4)

| 1  | 9  | 3  | 11 |
|----|----|----|----|
| 13 | 5  | 15 | 7  |
| 4  | 12 | 2  | 10 |
| 16 | 8  | 14 | 6  |

(N=8)

| 1  | 33 | 9  | 41 | 3  | 35 | 11 | 43 |
|----|----|----|----|----|----|----|----|
| 49 | 17 | 57 | 25 | 51 | 19 | 59 | 27 |
| 13 | 45 | 5  | 37 | 15 | 47 | 7  | 39 |
| 61 | 29 | 53 | 21 | 63 | 31 | 55 | 23 |
| 4  | 36 | 12 | 44 | 2  | 34 | 10 | 42 |
| 52 | 20 | 60 | 28 | 50 | 18 | 58 | 26 |
| 16 | 48 | 8  | 40 | 14 | 46 | 6  | 38 |
| 64 | 32 | 56 | 24 | 62 | 30 | 54 | 22 |

Alternative 2)

(N=2)

| 1 | 4 |
|---|---|
| 3 | 2 |

(N=4)

| 1  | 9  | 4  | 12 |
|----|----|----|----|
| 13 | 5  | 16 | 8  |
| 3  | 11 | 2  | 10 |
| 15 | 7  | 14 | 6  |

(N=8)

| 1  | 33 | 9  | 41 | 4  | 36 | 12 | 44 |
|----|----|----|----|----|----|----|----|
| 49 | 17 | 57 | 25 | 52 | 20 | 60 | 28 |
| 13 | 45 | 5  | 37 | 16 | 48 | 8  | 40 |
| 61 | 29 | 53 | 21 | 64 | 32 | 56 | 24 |
| 3  | 35 | 11 | 43 | 2  | 34 | 10 | 42 |
| 51 | 19 | 59 | 27 | 50 | 18 | 58 | 26 |
| 15 | 47 | 7  | 39 | 14 | 46 | 6  | 38 |
| 63 | 31 | 55 | 23 | 62 | 30 | 54 | 22 |

| 1 | 25 | 5 | 29 | 3 | 27 | 7 | 31 |
|---|----|---|----|---|----|---|----|
| 17 | 9 | 21 | 13 | 19 | 11 | 23 | 15 |
| 4 | 28 | 8 | 32 | 2 | 26 | 6 | 30 |
| 20 | 12 | 24 | 16 | 18 | 10 | 22 | 14 |

FIG. 18

| 1 | 33 | 9 | 41 | 3 | 35 | 11 | 43 |
|---|----|---|----|---|----|----|----|
| 49 | 17 | 57 | 25 | 51 | 19 | 59 | 27 |
| 13 | 45 | 5 | 37 | 15 | 47 | 7 | 39 |
| 61 | 29 | 53 | 21 | 63 | 31 | 55 | 23 |
| 4 | 36 | 12 | 44 | 2 | 34 | 10 | 42 |
| 52 | 20 | 60 | 28 | 50 | 18 | 58 | 26 |
| 16 | 48 | 8 | 40 | 14 | 46 | 6 | 38 |
| 64 | 32 | 56 | 24 | 62 | 30 | 54 | 22 |

OTFS BASIS ALLOCATION METHOD IN WIRELESS COMMUNICATION SYSTEM USING OTFS TRANSMISSION SYSTEM

This application is a National Stage Application of International Application No. PCT/KR2016/008200, filed on Jul. 27, 2016, which is hereby incorporated by reference in its entirety for all purposes as if fully set forth herein.

TECHNICAL FIELD

The present disclosure relates to wireless communication, and more particularly, to an OTFS basis allocation method in a wireless communication system using an OTFS transmission scheme and to a device for performing the method.

BACKGROUND

3GPP LTE (3rd Generation Partnership Project Long Term Evolution) system has been designed in a frame structure having a transmission time interval (TTI) of 1 ms, and its data request latency time for a video application is 10 ms. However, the future 5G technology requires data transmission of lower latency due to the advent of a new application such as real-time control and tactile internet, and it is expected that 5G data request latency will be lowered to reach 1 ms. Also, the future 5G technology requires more massive UE connectivity for one base station, and it is expected that 5G requirement connectivity will be increased to maximum 1,000,000/km$^2$.

DISCLOSURE

Technical Purpose

A technical purpose of the present disclosure is to provide a method for receiving OTFS basis allocation information by a user equipment in a wireless communication system using a OTFS transmission scheme.

Another technical purpose of the present disclosure is to provide a user equipment for receiving OTFS basis allocation information in a wireless communication system using the OTFS transmission scheme.

Technical tasks obtainable from the present disclosure are non-limited the above-mentioned technical task. And, other unmentioned technical tasks can be clearly understood from the following description by those having ordinary skill in the technical field to which the present disclosure pertains.

Technical Solution

In one aspect, there is provided a method for receiving orthogonal time, frequency and space (OFTS) basis allocation information by an user equipment in a wireless communication system using an OTFS transmission scheme, the method comprising: receiving control information including information regarding an OTFS basis size N from a base station; and receiving data on OTFS bases of a predetermined size indexed according to a pre-defined rule in an N×N OTFS transform matrix on time and frequency domains corresponding to the OTFS basis size, wherein the OTFS bases of the OTFS basis size N is represented into an N×N OTFS transform matrix, wherein in the N×N OTFS transform matrix, a row index represents a cyclic frequency shift index, and a column index represents a cyclic time shift index, wherein the indexing according to the pre-defined rule includes indexing the OTFS bases of the predetermined size in an order such that the cyclic frequency shift and the cyclic time shift in the N×N OTFS transform matrix are maximized. In one embodiment, the control information further includes information on OTFS index values of the OTFS bases of the predetermined size, wherein the receiving of the data includes receiving the data on OTFS bases indexed using the OTFS index values. In one embodiment, the control information further includes a number of layers allocated to the user equipment or a start layer number among the allocated layers. In one embodiment, a product between two different OTFS bases in the N×N OTFS transform matrix is zero. In one embodiment, the control information is received on a physical downlink control channel.

In another aspect, there is provided a user equipment (UE) for receiving orthogonal time, frequency and space (OFTS) basis allocation information in a wireless communication system using an OTFS transmission scheme, the UE comprising: a receiver; and a processor coupled to the receiver, wherein the processor is configured to: control the receiver to receive control information including information regarding an OTFS basis size N from a base station; and control the receiver to receive data on OTFS bases of a predetermined size indexed according to a pre-defined rule in an N×N OTFS transform matrix on time and frequency domains corresponding to the OTFS basis size, wherein the OTFS bases of the OTFS basis size N is represented into an N×N OTFS transform matrix, wherein in the N×N OTFS transform matrix, a row index represents a cyclic frequency shift index, and a column index represents a cyclic time shift index, wherein the indexing according to the pre-defined rule includes indexing the OTFS bases of the predetermined size in an order such that the cyclic frequency shift and the cyclic time shift in the N×N OTFS transform matrix are maximized. In one embodiment, the control information further includes information on OTFS index values of the OTFS bases of the predetermined size, wherein the processor is further configured to control the receiver to receive the data on OTFS bases indexed using the OTFS index values. In one embodiment, the control information further includes a number of layers allocated to the user equipment or a start layer number among the allocated layers. In one embodiment, a product between two different OTFS bases in the N×N OTFS transform matrix is zero. In one embodiment, the control information is received on a physical downlink control channel.

Technical Effect

One embodiment of the present disclosure can improve communication performance by mitigating ISI according to the OTFS transmission scheme.

Effects obtainable from the present disclosure may be non-limited by the above mentioned effect. And, other unmentioned effects can be clearly understood from the following description by those having ordinary skill in the technical field to which the present disclosure pertains.

BRIEF DESCRIPTION OF DRAWINGS

The accompanying drawings, which are included to provide a further understanding of the disclosure and are incorporated in and constitute a part of this specification, illustrate embodiments of the disclosure.

FIG. 13 shows an example to illustrate an order concept for indexing the OTFS basis.

FIG. 15 shows a shift example (N=4) of an indexing pattern for OTFS basis indexing.

FIG. 16 shows a shift example (N=8, 16) of the indexing pattern for OTFS basis indexing.

FIG. 17 is an illustrative diagram for illustrating an order concept for indexing an OTFS basis with a rectangular matrix.

FIG. 18 is an illustration of an example of the basis allocation between multiple users according to the OTFS basis allocation scheme.

DETAILED DESCRIPTIONS

Figure 1:
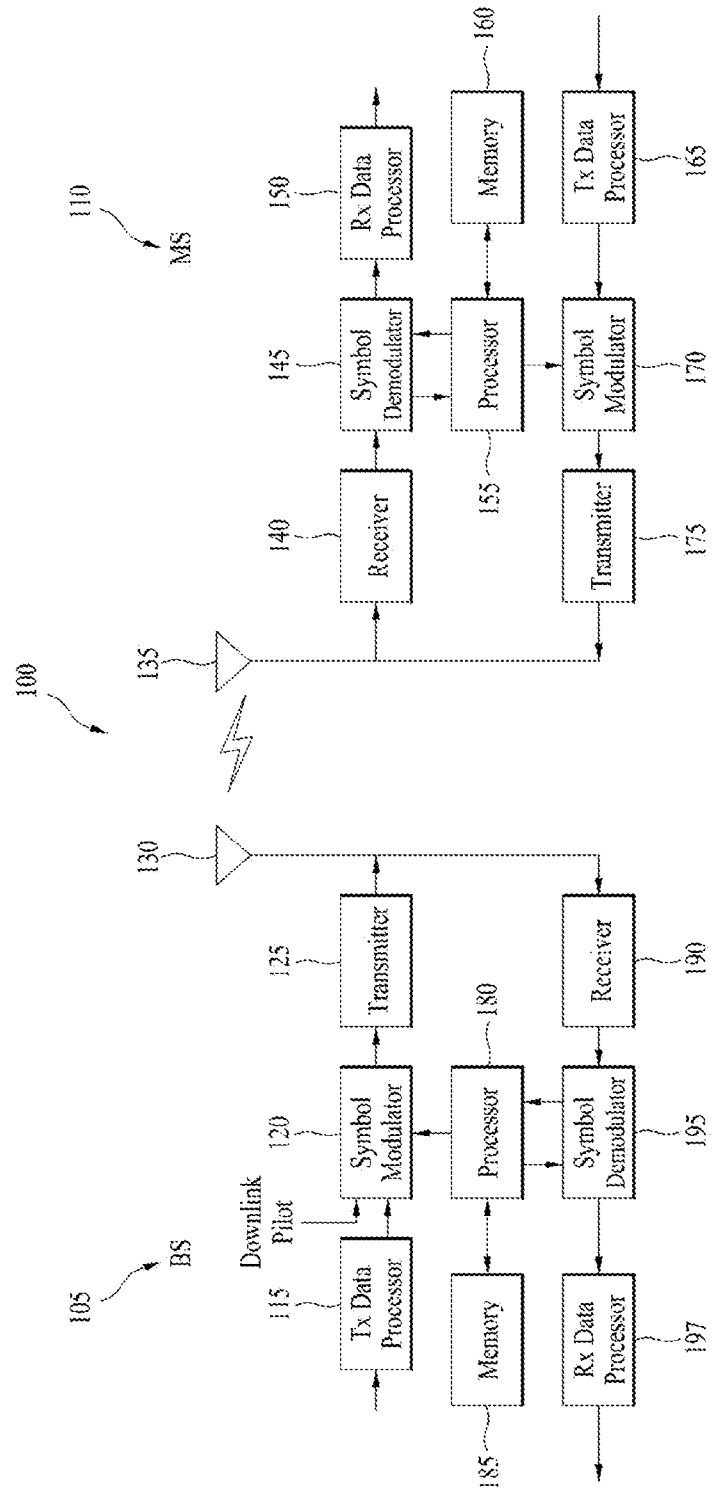
FIG. 1 is a block diagram illustrating a configuration of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

In case of performing wireless transmission between a base station and a UE, a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD).

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present disclosure proposes new and various frame structures for a 5th generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

Figure 2:
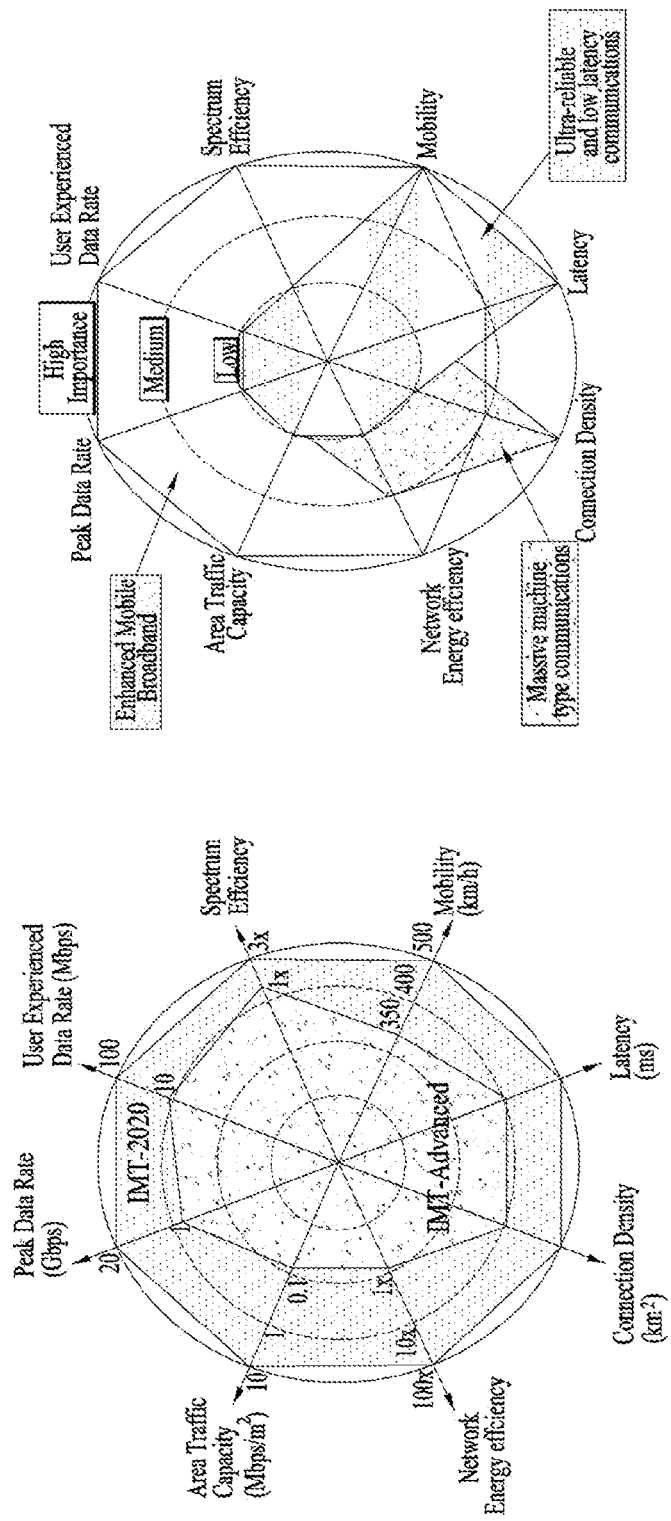
FIG. 2 shows an association between IMT 2020 core performance requirements for 5G and service scenario-based 5G performance requirements.

FIG. 2 is a diagram for explaining correlation between IMT 2020 core performance requirement for 5G and 5G performance requirement per service scenario.

FIG. 2 illustrates correlation between core performance requirement for 5G proposed by IMT 2020 and 5G performance requirement per service scenario. In particular, uMTC service has very high restriction on Over The Air (OTA) Latency Requirement and requires high mobility and high reliability (OTA Latency: <1 ms, Mobility: >500 km/h, BLER: <10-6).

In particular, in 5G communication system, transmission technology robust against high Doppler effect due to high speed and increase of a center frequency is needed. Recently, the Orthogonal Time, Frequency and Space (OTFS) transmission scheme has been introduced to have a better performance than the legacy OFDM communication system in high Doppler situations. This technique is based on the 2D channel model. In the case of the legacy 1D channel model, the channel in the time domain changes due to the influence of Doppler. This means that the channel changes randomly in mathematical modeling. Therefore, a reference signal for measuring the channel state over time is required.

On the other hand, 2D channel modeling simultaneously analyzes a channel in terms of time and frequency domains. Compared with the 1D channel modeling, the degree of channel change due to the Doppler effect may be included in the 2D channel modeling, and, thus, the channel may be regarded as a deterministic and non-random channel.

Thus, data may be transmitted robustly using the OTFS, a new transmission technique based on the 2D channel modeling, even on a channel having a change in the time domain and frequency selective characteristics in the frequency domain.

Figure 3:
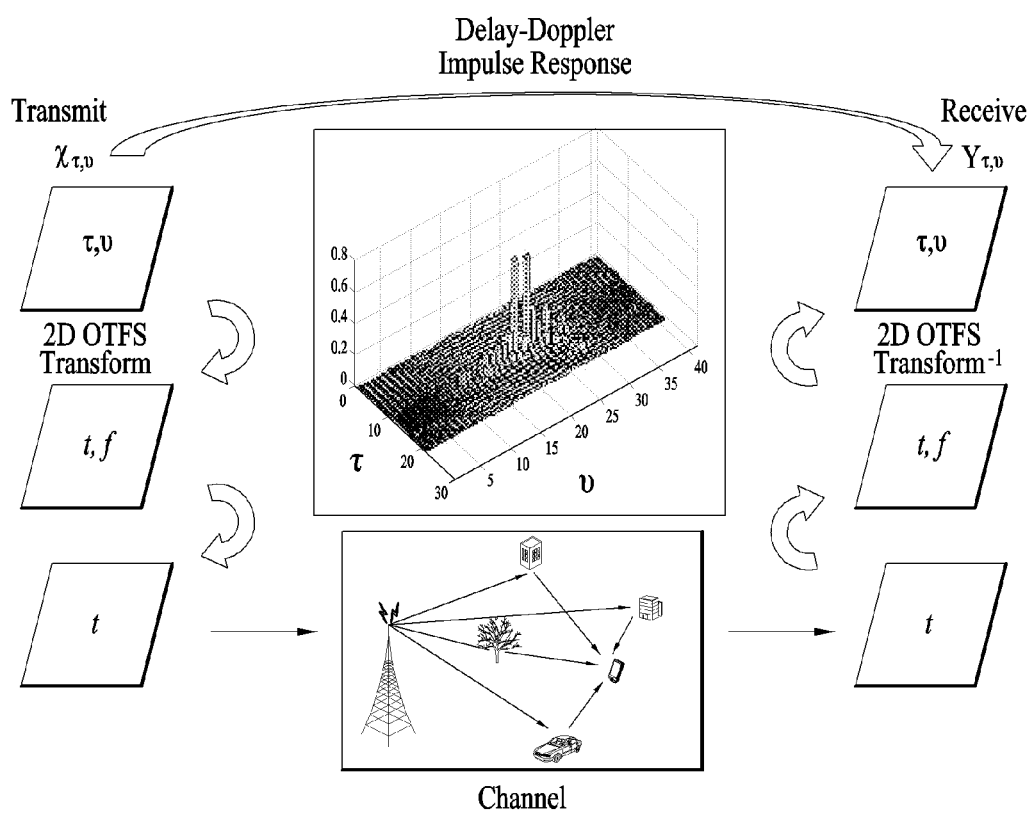
FIG. 3 is an illustration of an OTFS transmission mechanism according to the OTFS-2D approach.

FIG. 3 is an illustration of an OTFS transmission mechanism according to the OTFS-2D approach.

As shown in FIG. 3, transmission is performed based on the Delay-Doppler channel modeling, that is, 2D channel modeling. The OTFS transmission scheme is an example of a transmission scheme based on a 2D (Delay, Doppler) channel model. In the present disclosure, the OTFS is described below as an example.

Figure 4:
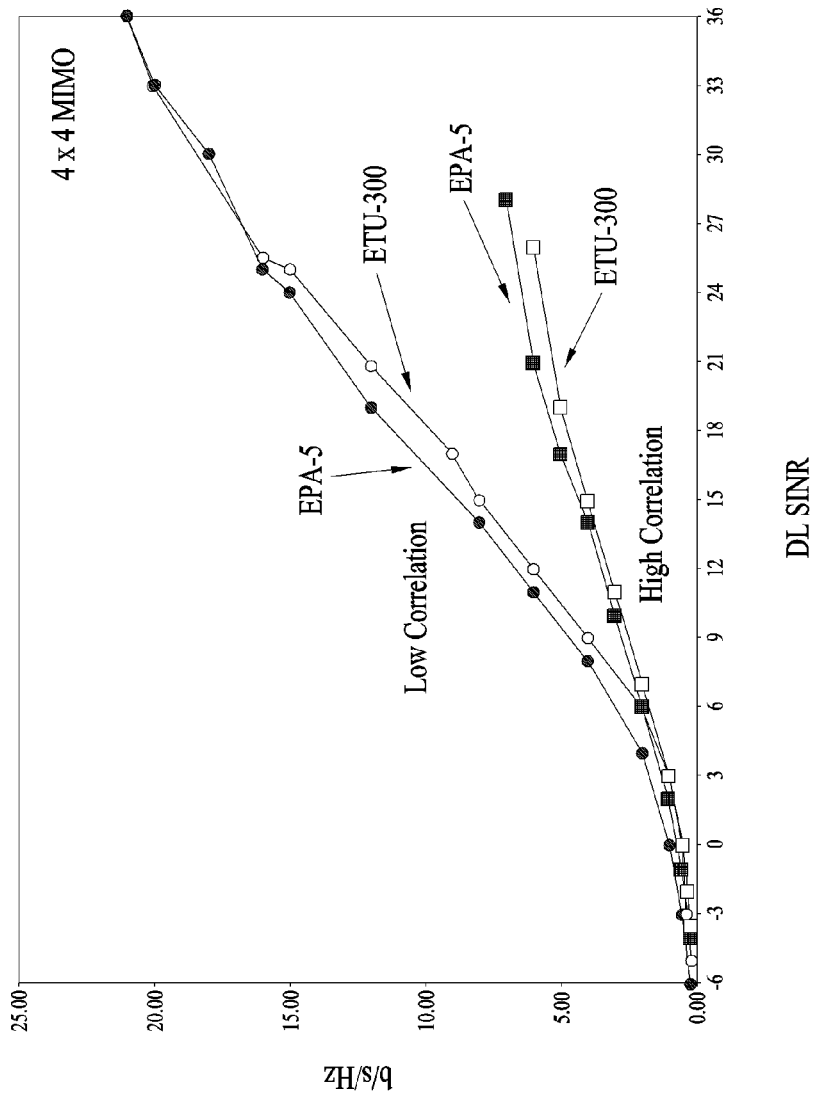
FIG. 4 shows the spectral efficiency of OTFS.

FIG. 4 shows a spectral efficiency of OTFS.

As shown in FIG. 4, it may be seen that EPA-5 (Doppler 5 Hz) and ETU-300 (Doppler 300 Hz) exhibit almost similar performances. That is, even when the delay and the Doppler increase, the OTFS transmission technology exhibits almost no performance deterioration.

Figure 5:
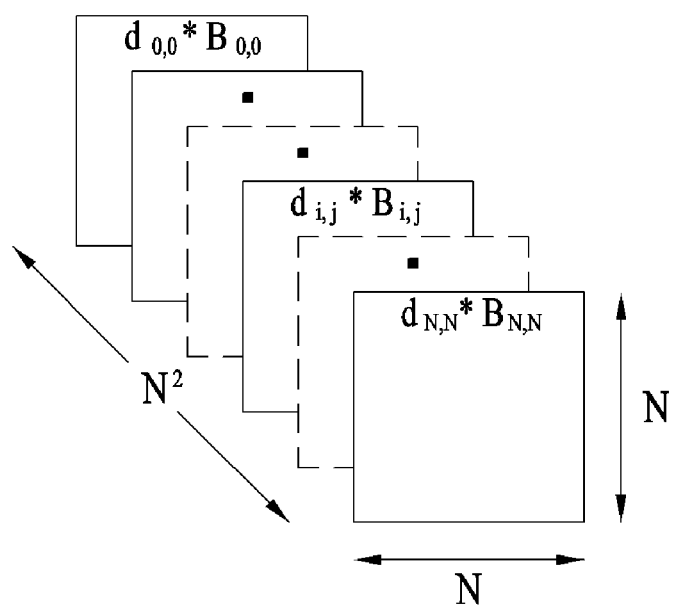
FIG. 5 shows a method for performing OTFS transformation by an OTFS transmission stage.

FIG. 5 shows a method of performing an OTFS transform by an OTFS transmission stage.

Figure 6:
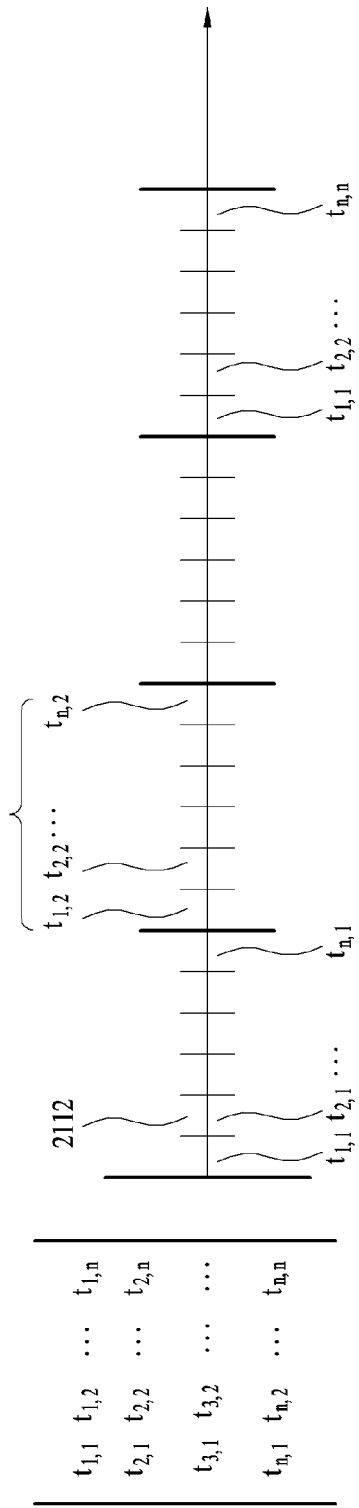
FIG. 6 shows an example of transmission on a time axis of an OTFS transformed matrix.

Referring to FIG. 5, a total size of N×N data is assumed. Each data d(i, j) is multiplied by B (i, j) as an orthonormal basis having a size of N×N, and, thus, is transformed. Then, as shown in FIG. 6, columns of a sum matrix of the thus-transformed matrices are mapped to each time domain and are transmitted. Herein, the orthonormal basis may also be referred to as the OTFS basis.

The orthonormal basis or OTFS basis may have a matrix form and may be represented as an N×N OTFS transform matrix, where N may be expressed as a power of 2. A row index of the OTFS transform matrix means a cyclic frequency shift index, while a column index of OTFS transform matrix means a cyclic time shift index. The orthonormal basis or OTFS basis may have orthonormal or near-orthonormal relationship in terms of 2-dimension, and may have cyclic time shift and cyclic frequency shift relationship.

Due to the delay spread and Doppler effect caused by the channel environment, orthonormal basis or OTFS basis used between symbols transmitted in an overlapping fashion may be impaired or inter-symbol interference (ISI) due to near-orthonormal degree may occur.

As for the orthonormal basis or OTFS basis, a product between different basis pairs is 0. Each basis is a matrix with a unit size and has cyclic shift characteristics in terms of the time/frequency domains. The basis may be called a time/frequency cyclic shift orthonormal matrix.

FIG. 6 shows a transmission example on a time axis of an OTFS-transformed matrix.

As shown in FIG. 6, each modulated symbol (e.g., QAM symbol) is transmitted on an orthonormal basis. A receiving stage performs an opposite procedure to the transmission procedure based on the transmitted orthonormal basis to perform demodulation. In this connection, in order to perform the demodulation, a procedure is needed to check how much delay and Doppler have influenced the transmitted signal on a transmission path basis via 2D channel estimation.

The procedure is solved using characteristics, that is, cyclically time-shifted or frequency-shifted waveforms of orthonormal basis. In other words, the transmission stage uses a single basis to send a pilot symbol, and the receiving stage finds out how much delay and Doppler have affected the symbol. How the receiving stage determines the effect by the delay and Doppler may be as follows: the channel estimation may be made by blanking basis corresponding to maximum delay and maximum Doppler values relative to the basis used as the pilot symbol.

Figure 7:
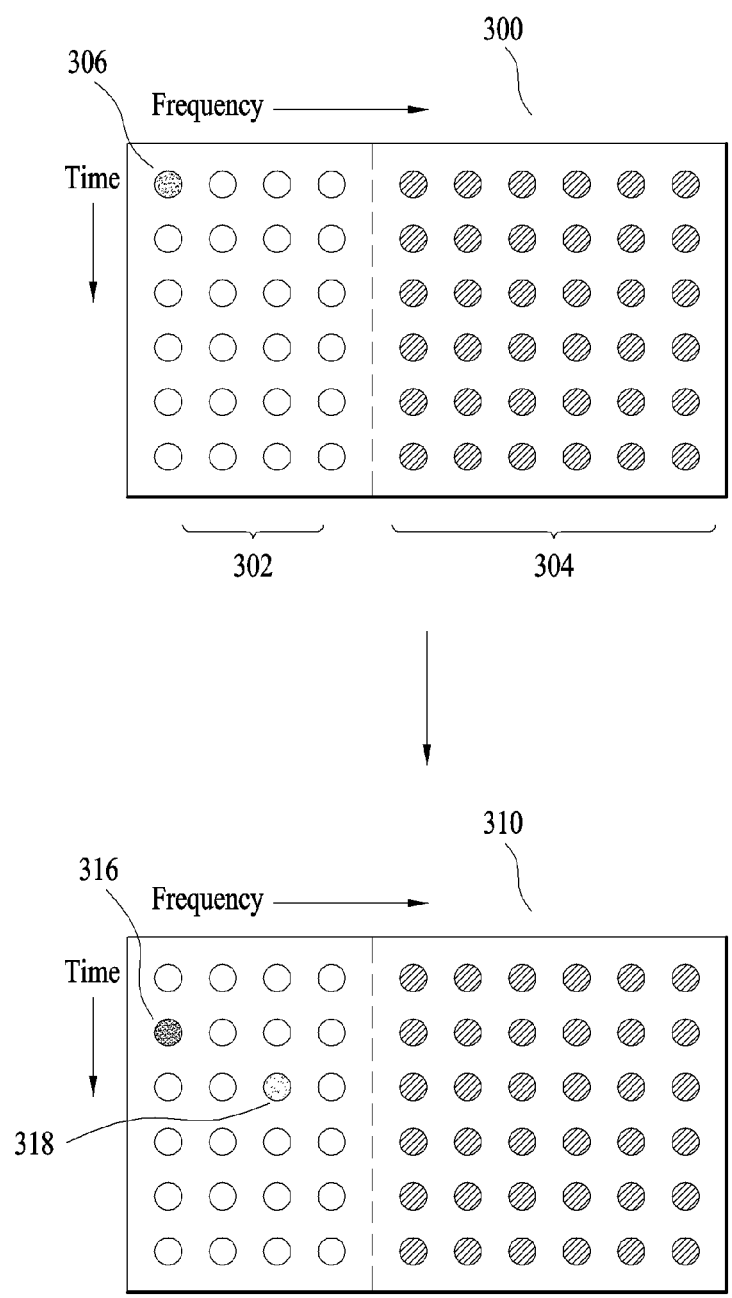
FIG. 7 shows an example of 2D channel estimation via a pilot on a OTFS transformed time-frequency domain.

FIG. 7 shows an example of 2D channel estimation using a pilot on a OTFS transformed time-frequency domain.

Referring to the time-frequency domain as shown at a top of FIG. 7, a pilot symbol is carried on a basis 306, and basis around the pilot symbol is blanked for channel estimation. Referring to the time-frequency domain shown at a bottom of FIG. 7, it may be seen that there are two channel paths after the 2D channel estimation. A first path 316 represents a channel with no Doppler effect and with a delay by one sample, while a second path 318 represents a channel in which only two samples of delay occur and a Doppler shift occurs by two. (In this connection, the sample refers to a smallest unit at which the receiving stage of a system using OTFS can detect the delay or Doppler. The channel estimation may allow a channel experienced by the symbol in the domain in which the data is sent to be known. Based on this knowledge, the signal as sent is detected via an equalizer.

In order to apply the above-mentioned OTFS to a system, selecting an orthonormal basis for the 2D channel estimation may be essential. According to the present disclosure, a signaling technique necessary between the user equipment and the base station in the OTFS transmission scheme will be proposed.

First, the downlink environment is considered. For purposes of illustration, a description will be made based on a 5G self-contained frame (or subframe) structure. However, the present method is not limited to the 5G self-contained frame (or subframe) structure.

Figure 8:
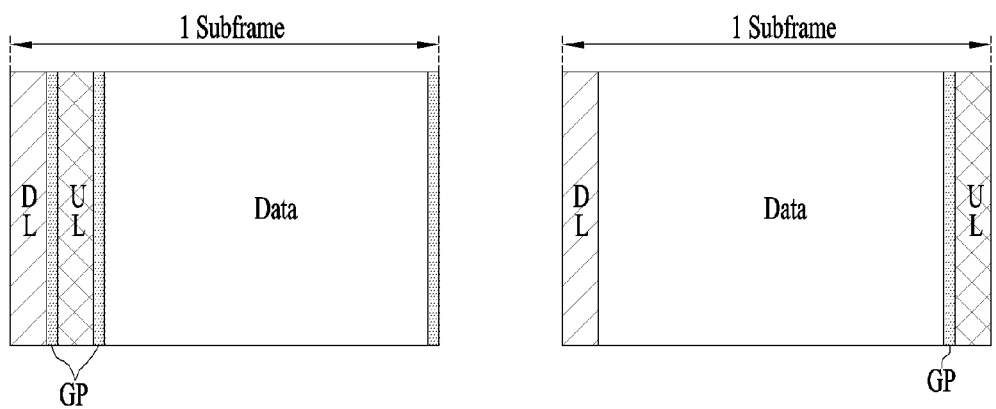
FIG. 8 is an illustration of a 5G self-contained frame (or subframe) structure.

FIG. 8 is an illustration of a 5G self-contained frame (or subframe) structure.

FIG. 8 shows a self-contained subframe or frame structure proposed to satisfy a low delay requirement among the 5G performance requirements. In the self-contained subframe (or frame) structure based on TDD (Time Division Duplex), resource regions for downlink and uplink is present in one subframe, and a guard period (GP) to solve the downlink/uplink interference problem, and a resource region for data transmission are present therein.

In the self-contained subframe structure shown on the left side of FIG. 8, the subframe is configured in an order of resource regions for downlink-uplink-data, and there is a GP between these resource regions. In the self-contained subframe structure shown on the right side of FIG. 8, a subframe is configured in an order of resource regions for downlink-data-uplink and there is a GP only in front of the resource region for the uplink.

Signaling Scheme Required Between User Equipment and Base Station in OTFS Transmission Scheme Embodiment 1

The base station uses a control channel to provide information about not only a resource region for the user equipment but also a location of a pilot symbol, a guard zone, and a set of basis using data.

Figure 9:
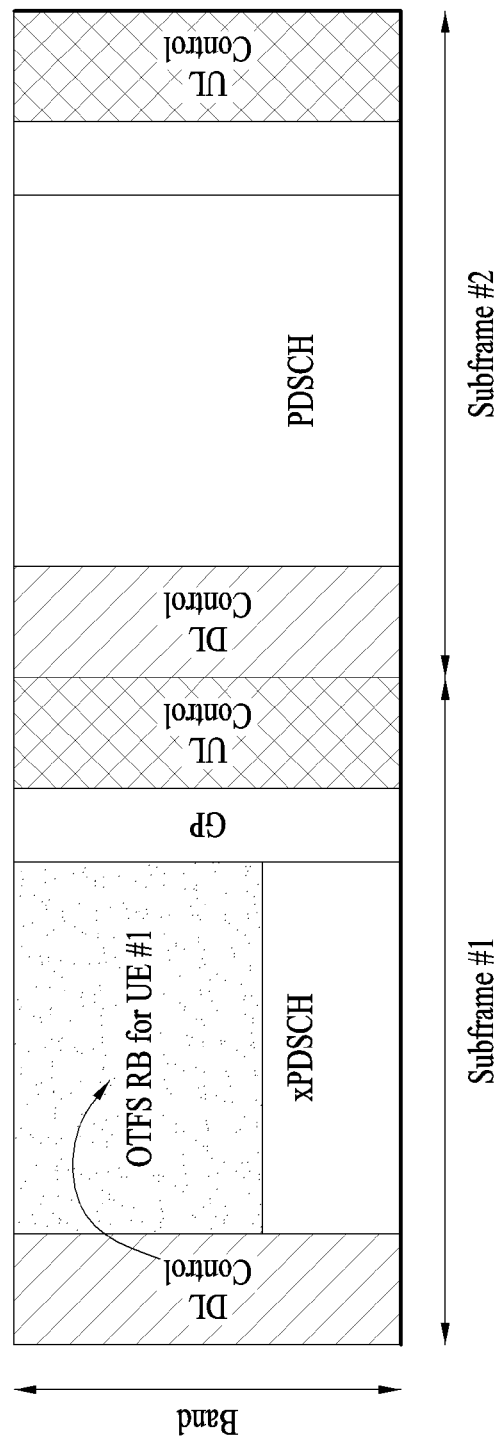
FIG. 9 shows an example of allocating an RB resource block for using an OTFS transmission scheme to a data region.

FIG. 9 shows an example in which an RB (Resource Block) is allocated to a data region to use the OTFS transmission scheme.

FIG. 9 shows an example in which an OTFS transmission scheme is applied to a data region in the self-contained frame structure. A user equipment 1 (UE 1) detects control information allocated thereto from a downlink control region (or a downlink control channel region) and then finds out a region allocated to the user equipment 1 within the data region.

Figure 10:
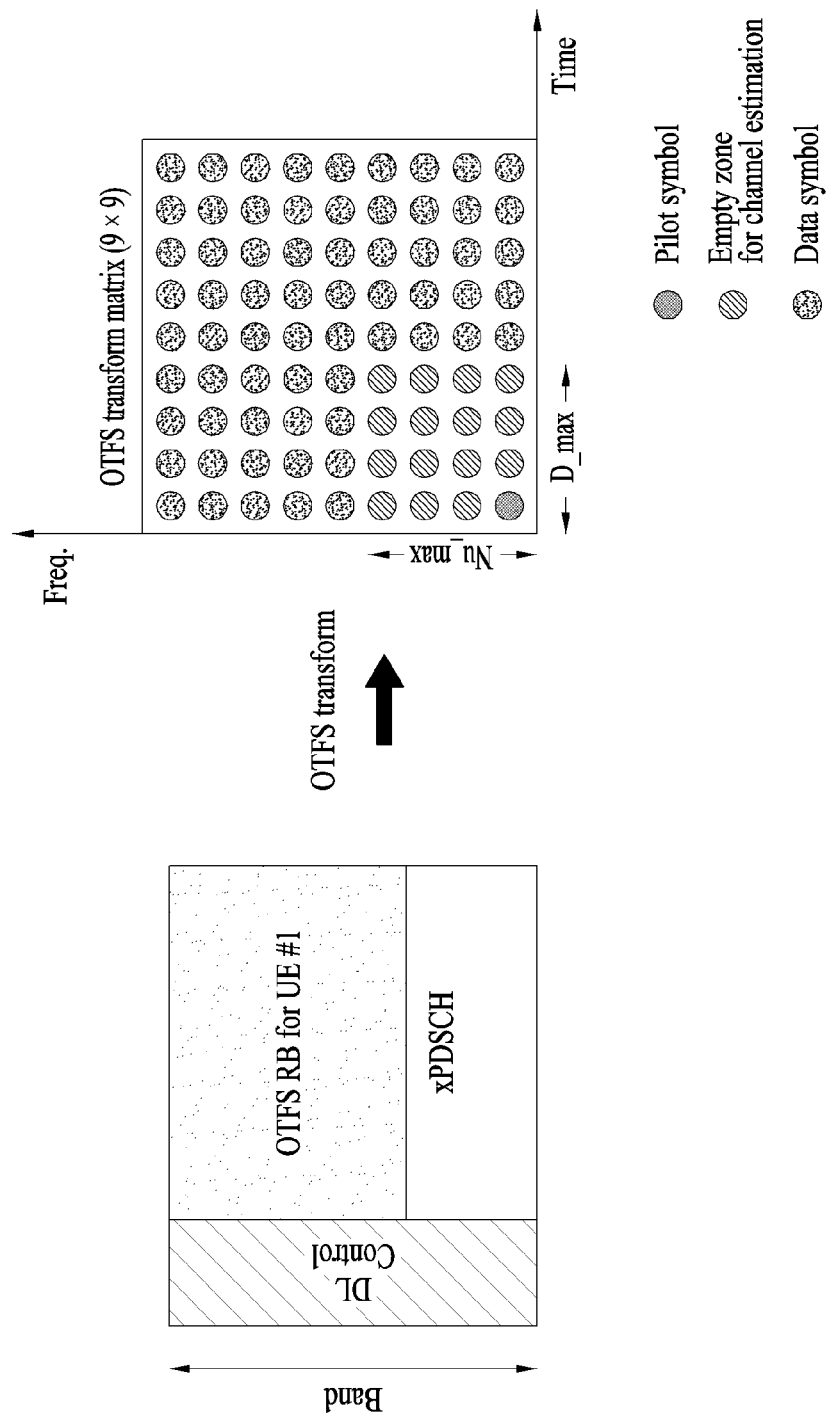
FIG. 10 shows an example of allocation of a pilot and data in OTFS RB.

FIG. 10 shows an example of allocation of pilot and data in OTFS RB.

FIG. 10 shows mapping of pilot and data in an OTFS transform domain to a OTFS RB region. As shown in the right side of FIG. 10, an OTFS matrix may be generated using a total of 9×9=81 basis. Among the above 81 basis, a pilot is allocated to a basis $B_{0,0}$ where both a time shift and a frequency shift are 0. Basis $B_{0,0}$, $B_{0,1}$, $B_{1,1}$, ..., $B_{4,4}$ of 4×4−1=15 with a maximum delay (D_max) and a maximum Doppler (Nu_max) are blanked or empty for the channel estimation. For data transmission, data is allocated to the remaining 65 basis.

The base station needs to notify an user equipment 1 (UE1) of following four pieces of information in addition to existing information such as existing MCS, RB, etc., using a downlink control channel (for example, PDCCH or ePDCCH). In this connection, the above-mentioned four pieces of information may be included and transmitted in a new DCI (Downlink Control Information) format within the PDCCH or the ePDCCH. The new DCI format may be transmitted on a conventional OFDM or OTFS basis.

1) basis information of the pilot signal (or reference signal) (for example, $B_{0,0}$)

2) basis information of the guard zone for channel estimation (for example, $B_{1,0}$, $B_{0,1}$, $B_{1,1}$, ..., $B_{4,4}$)

3) Information about a basis set to which data is assigned (for example, $B_{5,0}$, $B_{5,1}$, $B_{5,2}$, ..., $B_{5,9}$, ...)

4) Information on difference between powers for data and pilot signal

A procedure for the user equipment 1 to detect data based on the above four pieces of information is as follows. First, the user equipment 1 performs 2D channel estimation based on pilot position and guard zone position information. That is, the UE 1 may find a channel coefficient for a delay for each path and each Doppler shift by multiplying the received signal of a corresponding resource from $B_{0,0}$ to $B_{4,4}$. The UE 1 may know a degree to which each data is distorted by the delay and Doppler shift, based on this channel coefficient. The degree may be used to distinguish an original signal via an entire receiving equalizer. The user equipment 1 needs to know information about the difference between the powers for data and the pilot signal in order that the UE 1 may demodulate the received signal.

Figure 11:
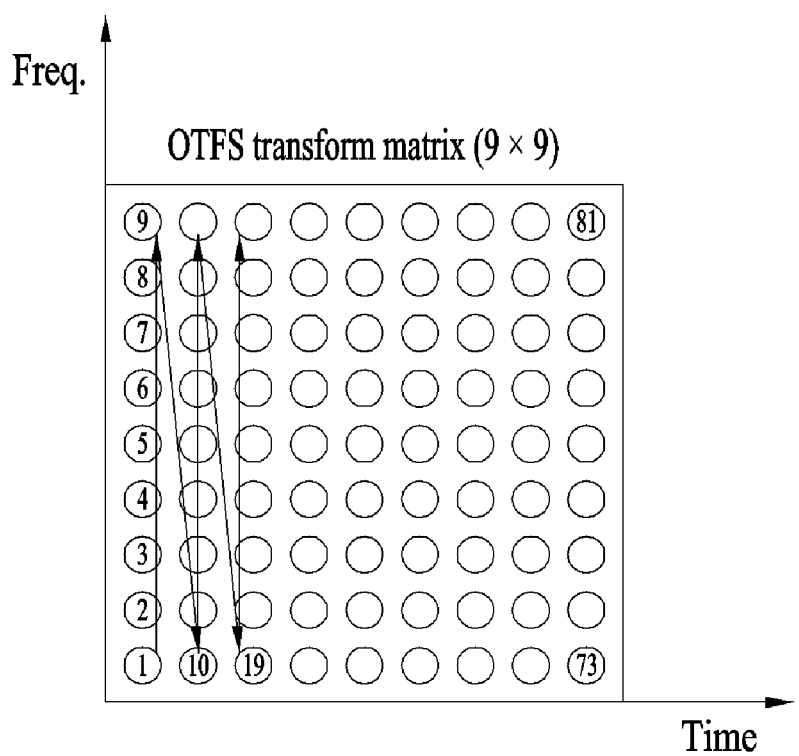
FIG. 11 shows an example of numbering of the basis.

FIG. 11 shows an example of numbering of the basis.

The base station may inform the user equipment of information about the pilot position, the guard zone for channel estimation, and a basis set to which the data are allocated on a downlink control channel using a predetermined method. In one example, FIG. 9 shows an example of using the numbering to inform the above information.

As shown in FIG. 11, an example in which the frequency domain is first numbered is shown. Referring to FIG. 11, it may be informed that the basis number for the pilot position is 1, the basis number for the guard zone is 31, and the base number for the data is {5 to 9, 14 to 18, 23 to 27, 32 to 81}. In another method, it may be informed that a bitmap format is used. In this case, the pilot position is (0,0), the guard zone is (4,4), the data zone is each vertex (5,0), (0,5), (9,9), (5,9), (9,5), (5,5). In addition, various schemes may be used. Further, the numbering method of the basis set may vary from cell to cell.

Further, the information on the pilot position and the guard zone among the above information may be set to in an user equipment-unspecified manner but cell-specific manner. The base station may inform the user equipment about the pilot position and guard zone via system information or higher layer signaling (e.g., RRC signaling).

Embodiment 2

In the case of MIMO transmission, information about the pilot position and the guard zone region for each layer may be transmitted by the base station to the user equipment using the downlink control channel.

Figure 12:
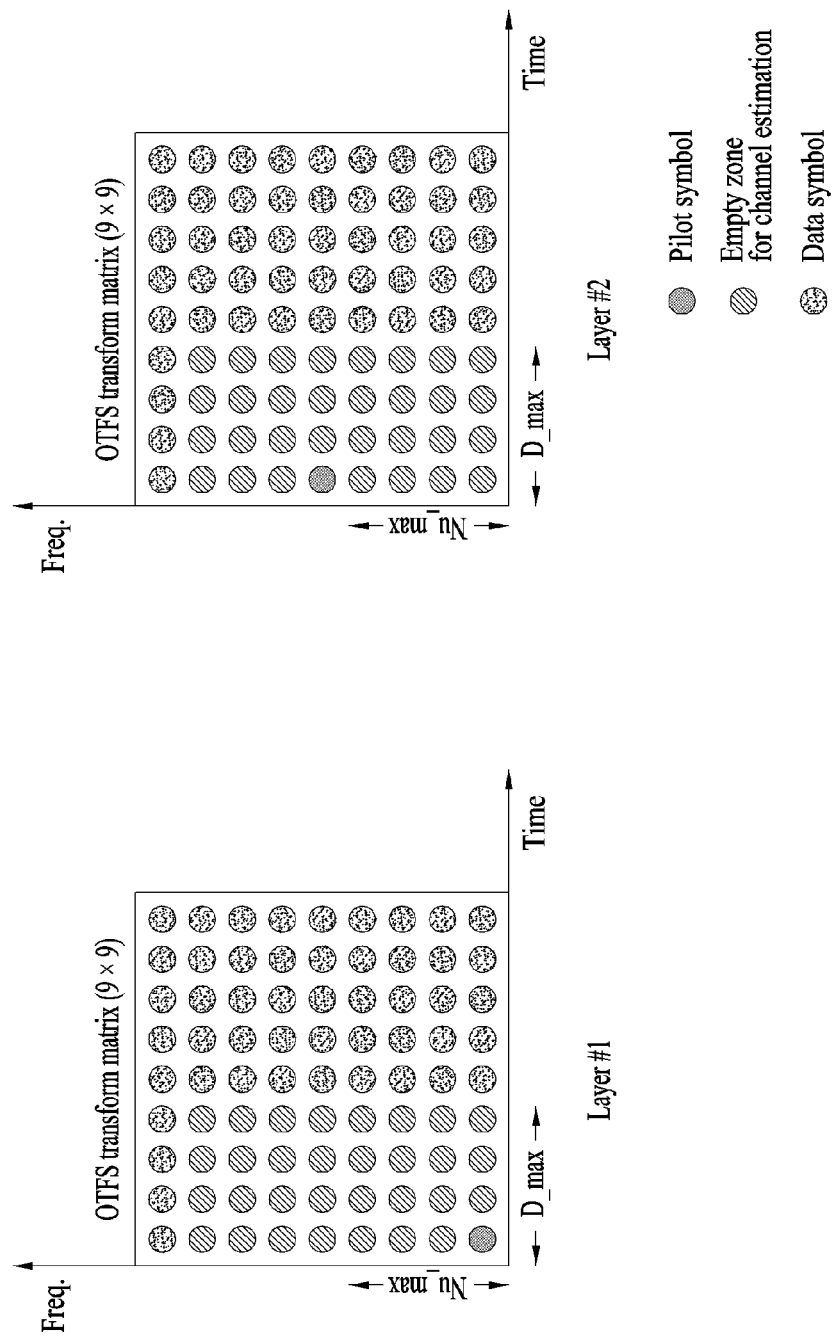
FIG. 12 shows an example of indicating each of a pilot location and a guard zone region for each layer for 2-layer transmission.

FIG. 12 shows an example in which the pilot position and the guard zone region for each layer are indicated in the case of two layers transmission.

FIG. 12 shows an example of OTFS-based pilot and guard zone allocation in the two layers transmission. That is, the base station informs the user equipment of each pilot position and guard zone allocation region for each layer. When the OTFS transmission is combined with multiple users, the layer #1 may be applied as information for the user equipment 1 (UE1), and the layer #2 may be applied as information for the user equipment 2 (UE2). However, in the case of a single user, only one guard zone may be indicated.

Even in case of uplink transmission, the base station may inform the user equipment of the control information (e.g., UL grant) via a downlink control channel in the same manner as in the downlink transmission.

Embodiment 3

In the case of downlink, D_max and Nu_max values for setting the guard zone are fed back using the control channel.

The user equipment may measure the delay and Doppler values for the downlink via the channel estimation and may feed back the maximum values thereof to the base station. Based on the feedback information, the base station may schedule the corresponding user equipment and set a guard zone. The feedback information may be communicated via, for example, a physical uplink control channel (PUCCH) or higher layer signaling (RRC signaling).

In the case of uplink, the base station may measure the maximum delay and Doppler using a signal such as SRS (Sounding Reference Signal). Thereafter, the base station may transmit a guard zone region to be used by the user equipment using a physical channel such as a PDCCH or an upper layer signal to the UE.

The signaling scheme required between the user equipment and the base station in the OTFS transmission scheme as described above may allow transmission based on OTFS to be performed more efficiently.

In order to apply the OTFS transmission scheme to the system, it is necessary to select OTFS basis for 2D channel estimation. In particular, according to the traffic demand change for a single user or a plurality of users in FIG. 5, all of $N^2$ data may be transmitted without overlapping. Then, when each data d (i, j) is transmitted on B(i, j), which is an OTFS basis, all of $N^2$ basses Bs(i, j) are not overlapped. Since B (i, j) has a orthonormal or near-orthonormal relation between bases and a cyclic time shift and cyclic frequency shift relationship, the inter-symbol interference (ISI) may be caused by the delay spread and the Doppler effect, which occur according to the channel environment. Thus, when all of $N^2$ bases are not used, an optimal basis allocation method based on the relationship between the bases may be required.

Further, in accordance with the present disclosure, we propose an optimal basis allocation method and exchange method based on the relationship between OTFS bases when all of the OTFS bases are not used in the OTFS transmission scheme.

Embodiment 4: Sparse Basis Allocation Scheme in OTFS System

FIG. 13 shows one example for representing an order concept for indexing the OTFS basis.

FIG. 13 illustrates an indexing scheme that maximizes the cyclic time/frequency shift degree for the OTFS basis when N=2, 4, and 8. In the schemes shown in FIG. 13, a scheme 1 (alternative 1) and a scheme 2 (alternative 2) have the same cyclic shift degree. The schemes will not have a difference in performance from the viewpoint of operation, and may be selected and fixedly used depending on operating characteristics. For convenience of illustration, the scheme 1 (alternative 1) is illustrated as an example. In this connection, it is apparent that the above-mentioned two indexing schemes 1 and 2 are equally applied. In FIG. 13, the number represented for each OTFS basis is the index for the OTFS basis. In the following example, it is assumed that a row index of a matrix represents a cyclic frequency shift index, and a column index represents a cyclic time shift index. It is obvious that the matrix may be illustrated by exchanging the time and frequency between the row index and the column index of the matrix.

When N=2, the index 1 and index 2 in FIG. 13 have the farthest cyclic time/frequency shift. Since the matrix form for the OTFS orthonormal basis is defined in terms of cyclic shifts, when N=4, the index 1 and index 5 has one time shift and one frequency shift and index 1 and index 6 has one time shift and one frequency shift. Thus, when N=4, the index 1 and index 2 have the farthest cyclic time/frequency shift. In the same way, when N=8, the index 1 and index 2 have the farthest cyclic time/frequency shift.

As an example of a matrix coordinate representation, when N=2, the matrix coordinates (1,1) and (2,2) have the farthest cyclic time/frequency shift. Since the matrix form for OTFS orthonormal basis is defined in terms of cyclic shift, when N=4, the coordinates (1,1) and (2,2) one time shift and one frequency shift and the coordinates (1,1) and (4,4) has one time shift and one frequency shift. Therefore, when N=4, the coordinates (1,1) and (3,3) of the matrix have the farthest cyclic time/frequency shift. In this same way, when N=8, the coordinates (1,1) and (5,5) of the matrix have the farthest cyclic time/frequency shift.

The present disclosure may define the indexing of the matrix coordinates based on the distance of the cyclic time/frequency shift, and generalize the indexing as shown in Table 1 below.

TABLE 1

If N ≥ 1, Basis(1) = (1,1), Indexing: Basis(1) =[1]

If $N \geq K$, Basis($K$) = Basis$\left(\frac{K}{2}\right)$ + $\begin{bmatrix} (0, 0), & \left(0, \frac{N}{K}\right) \\ \left(\frac{N}{K}, 0\right), & \left(\frac{N}{K}, \frac{N}{K}\right) \end{bmatrix}$, Indexing: Basis($K$) =[1]~[$K^2$]

If $N \geq 2$, Basis(2) = Basis(1) + $\begin{bmatrix} (0, 0), & \left(0, \frac{N}{2}\right) \\ \left(\frac{N}{2}, 0\right), & \left(\frac{N}{2}, \frac{N}{2}\right) \end{bmatrix}$, Indexing: Basis(2) =[1]~[4]

If $N \geq 4$, Basis(4) = Basis(2) + $\begin{bmatrix} (0, 0), & \left(0, \frac{N}{4}\right) \\ \left(\frac{N}{4}, 0\right), & \left(\frac{N}{4}, \frac{N}{4}\right) \end{bmatrix}$, Indexing: Basis(4) =[1]~[16]

If $N \geq 8$, Basis (8) = Basis(4) + $\begin{bmatrix} (0, 0), & \left(0, \frac{N}{8}\right) \\ \left(\frac{N}{8}, 0\right), & \left(\frac{N}{8}, \frac{N}{8}\right) \end{bmatrix}$, Indexing: Basis(8) =[1]~[64]

If $N \geq 16$, Basis(16) = Basis(8) + $\begin{bmatrix} (0, 0), & \left(0, \frac{N}{16}\right) \\ \left(\frac{N}{16}, 0\right), & \left(\frac{N}{16}, \frac{N}{16}\right) \end{bmatrix}$, Indexing: Basis(16) =[1]~[256]

Basis(32), Basis(64) ... are generalized in the same manner.

Figure 14:
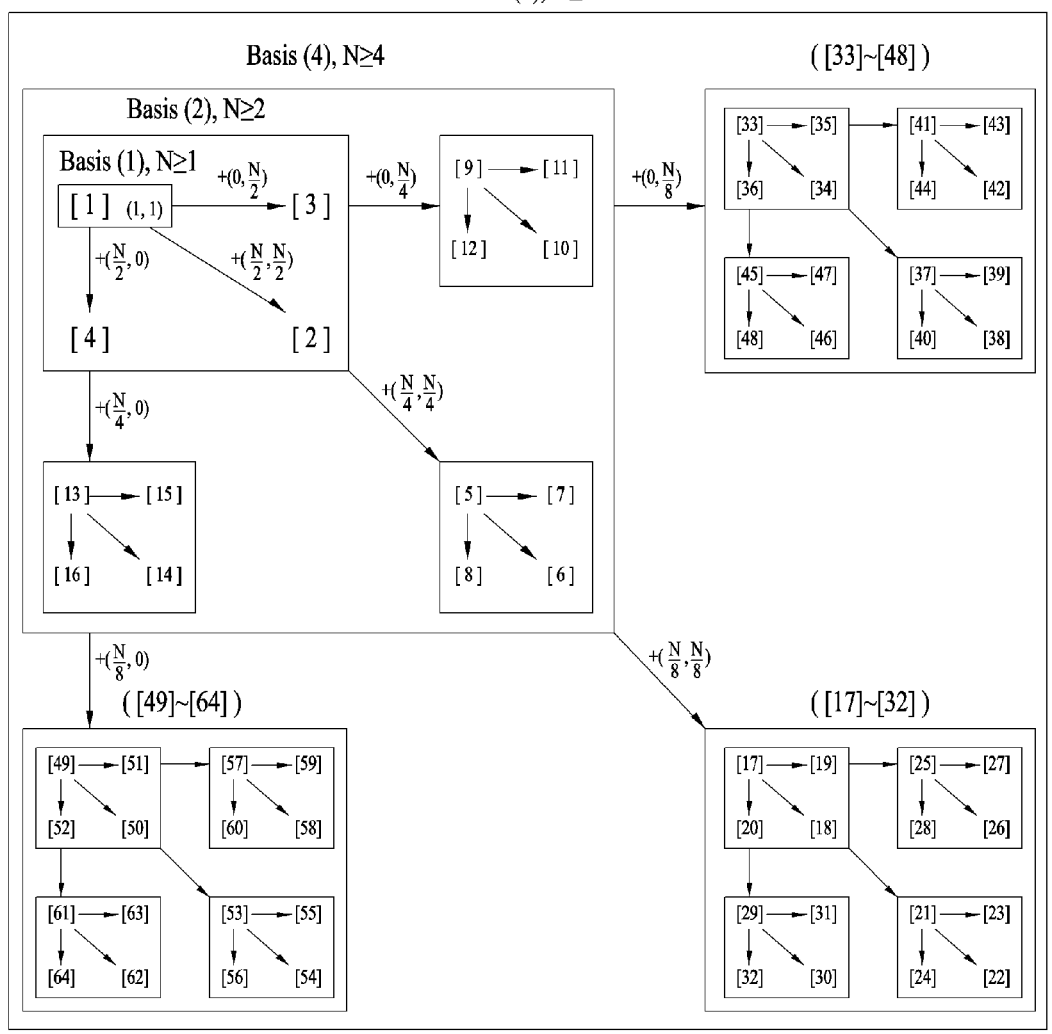
FIG. 14 is a schematic diagram of a generalized scheme for indexing the OTFS basis.

FIG. 14 is a schematic diagram of the OTFS basis indexing generalization scheme.

Referring to FIG. 14, a higher basis is formed by changing the row index and column index of the matrix according to the formula of Table 1 based on the basis (Basis)(1). The formula of Table 1 shows a configuration in which the pattern of the OTFS basis indexing order is shifted by (row and column) on the matrix.

In FIG. 14, for basis (Basis)(2) (when N=2), the matrix coordinate at the index 1 is (1, 1); the coordinate (2,2), which is the matrix coordinate (1,1) at the index 1 plus the matrix coordinate (N/2, N/2) shown in FIG. 14 is the matrix coordinate at the index 2; the coordinate (1,2), which is the matrix coordinate (1,1) at the index 1 plus the matrix coordinate (0, N/2) shown in FIG. 14 is the matrix coordinate at the index 3; and the coordinate (2,1), which is the matrix coordinate (1,1) at the index 1 plus the matrix coordinate (N/2, 0) shown in FIG. 14 is the matrix coordinate at the index 4.

In FIG. 14, for basis (Basis)(4) (when N=4), adding the matrix coordinates of (0, N/4), (N/4, 0), (N/4, N/4) as shown FIG. 14 to the matrix coordinates for the basis (Basis)(2) (when N=2) may result in a total number of 4×4 bases which may be indexed as shown in FIG. 14. Similarly, in FIG. 14, for basis (Basis)(4) (when N=8), adding the matrix coordinates of (0, N/8), (N/8, 0), (N/8, N/8) as shown FIG. 14 to the matrix coordinates for the basis (Basis)(4) (when N=4) may result in a total number of 8×8 bases which may be indexed as shown in FIG. 14.

Figures 15, 16:
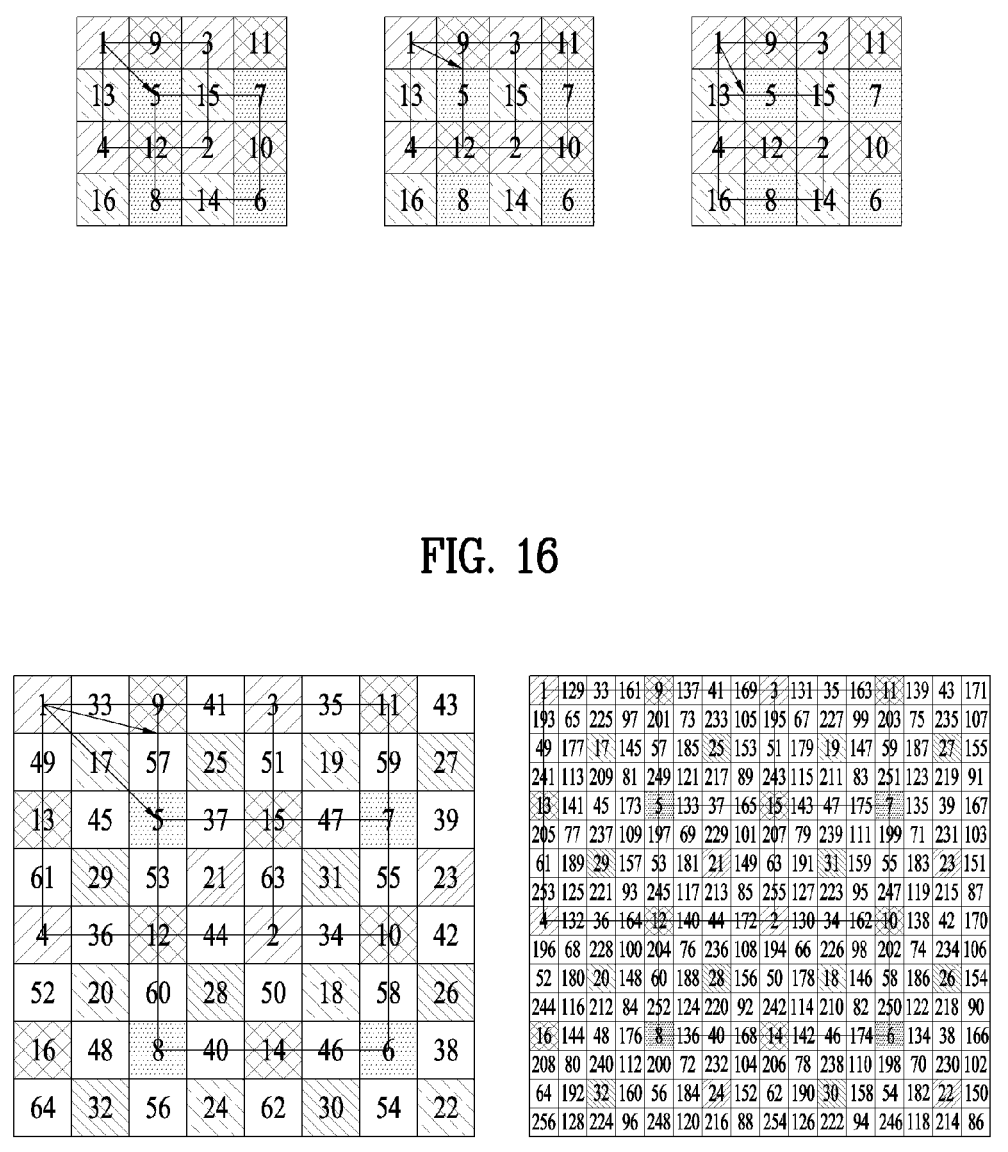

FIG. 15 shows a shift example (N=4) of the indexing pattern for OTFS basis indexing.

FIG. 15 illustrates the shift scheme of the OTFS basis pattern illustrated in FIG. 14. For N=4, the index of the basis (Basis)(1) is mapped to the coordinate (1,1). In the basis (Basis)(2), the index $$\begin{bmatrix} [1], & [3] \\ [4], & [2] \end{bmatrix}$$

is mapped to $$\begin{bmatrix} (1,1), & (1,3) \\ (3,1), & (3,3) \end{bmatrix}.$$

Then, the basis (Basis)(2) is (N/4, N/4) shifted such that the index $$\begin{bmatrix} [5], & [7] \\ [8], & [6] \end{bmatrix}$$

is mapped to $$\begin{bmatrix} (2,2), & (2,4) \\ (4,2), & (4,4) \end{bmatrix}.$$

Then, the basis (Basis)(2) is (0, N/4) shifted in the same manner, such that the indexes of [9] to [12] are mapped. Then, the basis (Basis)(2) is (N/4, 0) shifted in the same manner, such that the indexes of [13] to [16] are mapped.

FIG. 16 shows a shift example (N=8, 16) of the indexing pattern for OTFS basis indexing.

FIG. 16 illustrates the shift scheme of the OTFS basis pattern when N=8, 16. For N=8, the index of the basis (Basis)(1) is mapped to the coordinate (1,1). In the basis (Basis)(2), the index $$\begin{bmatrix} [1], & [3] \\ [4], & [2] \end{bmatrix}$$

is mapped to $$\begin{bmatrix} (1,1), & (1,5) \\ (5,1), & (5,5) \end{bmatrix}.$$

Then, the basis (Basis)(2) is (N/4, N/4) shifted such that the index $$\begin{bmatrix} [5], & [7] \\ [8], & [6] \end{bmatrix}$$

is mapped to $$\begin{bmatrix} (3,3), & (3,7) \\ (7,3), & (7,7) \end{bmatrix}.$$

Then, the basis (Basis)(2) is (0, N/4) shifted in the same manner, such that the indexes of [9] to [12] are mapped. Then, the basis (Basis)(2) is (N/4, 0) shifted in the same manner, such that the indexes of [13] to [16] are mapped. The Basis (Basis)(4) is defined by the [1] to [16] as defined above. In the same manner, the [17] to [64] are defined to be extended to the basis (Basis)(8).

For N=16, the index of the basis (Basis)(1) is mapped to the coordinate (1,1). In the basis (Basis)(2), the index $$\begin{bmatrix} [1], & [3] \\ [4], & [2] \end{bmatrix}$$

is mapped to $$\begin{bmatrix} (1,1), & (1,9) \\ (9,1), & (9,9) \end{bmatrix}.$$

Then, the basis (Basis)(2) is (N/4, N/4) shifted such that the index $$\begin{bmatrix} [5], & [7] \\ [8], & [6] \end{bmatrix}$$

is mapped to $$\begin{bmatrix} (5,5), & (5,13) \\ (13,5), & (13,13) \end{bmatrix}.$$

Then, the basis (Basis)(2) is (0, N/4) shifted in the same manner, such that the indexes of [9] to [12] are mapped. Then, the basis (Basis)(2) is (N/4, 0) shifted in the same manner, such that the indexes of [13] to [16] are mapped. The Basis (Basis)(4) is defined by the [1] to [16] as defined above. In the same manner, the [17] to [64] are defined to be extended to the basis (Basis)(8). In the same manner, the [65] to [256] are defined to be extended to the basis (Basis)(16).

The Embodiment 4 is proposed for cases where OTFS basis has a square matrix. The OTFS basis may not have the square matrix, depending on channel characteristics or application system characteristics. For example, the OTFS basis has the following features (1), (2), and (3) when the OTFS basis has a rectangular matrix.

(1). The OTFS basis may be expressed in a matrix form as an N×M OTFS transform matrix, where N is not M.

(2). The row index N of the matrix represents the cyclic frequency shift index, while the column index M of the matrix means the cyclic time shift index. The OTFS basis has an orthonormal or near-orthonormal relationship and has the cyclic time shift and cyclic frequency shift relationship in the 2-dimension.

(3). ISI due to Impairment or Near-Orthonormal degree of the OTFS basis used between superimposed transmission symbols due to the delay spread and Doppler effect caused by the channel environment occurs.

When the OTFS basis has a rectangular matrix, it is difficult to index the OTFS basis in one generalized form.

FIG. 17 is an illustrative diagram for illustrating the indexing order concept for an OTFS basis with a rectangular matrix.

FIG. 17 illustrates an ordering concept for indexing the basis of an OTFS with a rectangular matrix. In addition to this scheme, there are a variety of indexing schemes that minimize the ISI. Therefore, for the indexing of the rectangular matrix, one of the optimal indexing order combinations for each rectangular matrix should be indicated in advance to the base station and user equipment. Generally, due to signaling overhead issues, various rectangular matrix combinations may not be applied to communication systems.

Embodiment 5: Signaling Scheme of Sporadic Sparse Basis Index in OTFS System Using the indexing scheme proposed in the Embodiment 4, sparsity is formed between the bases of OTFS. It is also possible to maximize the degree of cyclic time/frequency shift according to the indexing order. Assuming an OTFS basis with a square matrix, it is necessary for the base station to signal, to the user equipment, information 1, 2 and 3 below:

1. Basis size: N
2. Starting number among allocated layers: S (where, $1 \leq S \leq N^2$)
3. Number of allocated layers L (where $1 \leq L \leq N^2$).

Assuming a downlink, the base station may transmit the information (N, S, L) to a user equipment using a downlink physical control channel (for example, a PDCCH). Assuming an uplink, the information (N, S, L) may be pre-allocated from the base station to the UE via a downlink physical control channel (for example, a PDCCH) or may be transmitted from the UE to the base station using an uplink physical control channel (for example, a PUCCH). Further, the information (N, S, L) may be communicated via the higher layer signaling in the downlink or uplink.

Among the above information, the N (basis size information) may be transmitted as common information for one basis. The starting number (S) among the allocated layers and the number of allocated layers (L) may be delivered as UE-specific (or user-specific) information when a large number of users are supported in one basis.

Embodiment 6: Basis Allocation Example Between Multiple Users According to OTFS Basis Allocation Scheme FIG. 18 is an illustration of one example of the basis allocation between multiple users according to the OTFS basis allocation scheme.

FIG. 18 assumes that the basis size N as common control information for multiple user equipment or multiple users is 8. Further, S=1 and L=10 are set as the user equipment 1 (UE 1)-specific information. The user equipment 1 has been allocated bases having index [1] to index [10]. S=11 and L=6 are set as the user equipment 2 (UE 2)-specific information. The user equipment 2 has been allocated bases having index [11] to index [16]. S=17 and L=8 are set as the user equipment 3 (UE 3)-specific information. The user equipment 3 has been allocated bases having index [17] to index [24].

Referring to FIG. 18, it may be seen that data is not transmitted using the bases having the index [25] to index [64]. The base station signals the allocated OTFS basis index value to each user equipment so that each user equipment can receive data on the corresponding OTFS basis based on the OTFS basis index value allocated thereto.

According to one embodiment of the present disclosure, communication performance may be improved by mitigating the ISI according to the OTFS transmission scheme.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present disclosure may be applied to various wireless communication systems such as 3GPP LTE-A, 5G communication system and the like.

The invention claimed is:

1. A method of receiving orthogonal time, frequency and space (OTFS) basis allocation information by a user equipment (UE) in a wireless communication system using an OTFS transmission scheme, the method comprising:
   receiving, by a UE, control information including information regarding an OTFS basis size N from a base station;
   based on less than all N×N OFTS bases being used, determining, by the UE, OTFS bases of a predetermined size according to an order of OTFS index values, the OTFS bases being indexed according to a predefined rule in an N×N OTFS transform matrix on N×N time and frequency domains corresponding to the OTFS basis size; and receiving, by the UE, data on the determined OFTS bases having one or more consecutive index values, wherein the OTFS bases of OTFS basis size N are represented by an N×N OTFS transform matrix, wherein in the N×N OTFS transform matrix, a row index represents a cyclic frequency shift index, and a column index represents a cyclic time shift index, wherein the indexing according to the pre-defined rule includes indexing the N×N OTFS bases of the predetermined size in an order such that the cyclic frequency shift and the cyclic time shift in the N×N OTFS transform matrix are maximized, and consecutive index values have a maximum cyclic frequency shift and cyclic time shift.

2. The method of claim 1, wherein the control information further includes information on the OTFS index values of the OTFS bases of the predetermined size, and wherein the receiving of the data includes receiving the data on OTFS bases indexed using the OTFS index values.

3. The method of claim 1, wherein the control information further includes at least one of a number of layers allocated to the UE or a start layer number among the allocated layers.

4. The method of claim 1, wherein the control information is received on a physical downlink control channel.

5. A user equipment (UE) for receiving orthogonal time, frequency and space (OTFS) basis allocation information in a wireless communication system using an OTFS transmission scheme, the UE comprising:

a receiver; and a processor operatively coupled to the receiver, wherein the processor is configured to:

control the receiver to receive control information including information regarding an OTFS basis size N from a base station;

based on less than all N×N OFTS bases being used, determine OTFS bases of a predetermined size according to an order of OTFS index values, the OTFS bases being indexed according to a pre-defined rule in an N×N OTFS transform matrix on N×N time and frequency domains corresponding to the OTFS basis size; and control the receiver to receive data on the determined OFTS bases having one or more consecutive index values, wherein the OTFS bases of OTFS basis size N are represented by an N×N OTFS transform matrix, wherein in the N×N OTFS transform matrix, a row index represents a cyclic frequency shift index, and a column index represents a cyclic time shift index, wherein the indexing according to the pre-defined rule includes indexing the N×N OTFS bases of the predetermined size in an order such that the cyclic frequency shift and the cyclic time shift in the N×N OTFS transform matrix are maximized, and consecutive index values have a maximum cyclic frequency shift and cyclic time shift.

6. The UE of claim 5, wherein the control information further includes information on the OTFS index values of the OTFS bases of the predetermined size, and wherein the processor is further configured to control the receiver to receive the data on OTFS bases indexed using the OTFS index values.

7. The UE of claim 5, wherein the control information further includes at least one of a number of layers allocated to the UE or a start layer number among the allocated layers.

8. The UE of claim 5, wherein the control information is received on a physical downlink control channel.

9. The method of claim 1, wherein the OTFS basis size N included in the control information is common information for multiple UEs including the UE, and wherein the at least one of the number of layers allocated to the UE or the start layer number among the allocated layers is UE-specific information.

10. The method of claim 9, wherein the OTFS bases are determined based on the OTFS basis size N, the number of layers, and the start layer number.

11. The UE of claim 5, wherein the OTFS basis size N included in the control information is common information for multiple UEs including the UE, and wherein the at least one of the number of layers allocated to the UE or the start layer number among the allocated layers is UE-specific information.

12. The UE of claim 11, wherein the OTFS bases are determined based on the OTFS basis size N, the number of layers, and the start layer number.

* * * * *